United States Patent
Doke

(10) Patent No.: US 10,087,021 B2
(45) Date of Patent: Oct. 2, 2018

(54) SECURE TOTE FOR ORDER FULFILLMENT AND METHOD OF OPERATION THEREOF

(71) Applicant: Cornerstone Automation Systems, LLC, Frisco, TX (US)

(72) Inventor: Michael J. Doke, Frisco, TX (US)

(73) Assignee: Cornerstone Automation Systems, LLC, Frisco, TX (US)

( * ) Notice: Subject to any disclaimer, the term of this patent is extended or adjusted under 35 U.S.C. 154(b) by 0 days.

(21) Appl. No.: 15/189,477

(22) Filed: Jun. 22, 2016

(65) Prior Publication Data

US 2016/0368653 A1   Dec. 22, 2016

Related U.S. Application Data

(60) Provisional application No. 62/182,795, filed on Jun. 22, 2015.

(51) Int. Cl.
*B65G 1/137* (2006.01)
*B65G 65/00* (2006.01)

(52) U.S. Cl.
CPC .............. *B65G 65/00* (2013.01); *B65G 1/137* (2013.01); *B65G 1/1373* (2013.01)

(58) Field of Classification Search
CPC ....... B65G 1/137; B65G 1/1373; B65G 65/00
See application file for complete search history.

(56) References Cited

U.S. PATENT DOCUMENTS

| | | | |
|---|---|---|---|
| 2004/0129810 A1* | 7/2004 | Kasprowicz | B02C 18/0007 241/101.2 |
| 2005/0051544 A1* | 3/2005 | Looker | B65D 88/14 220/1.5 |
| 2007/0256797 A1* | 11/2007 | Orton | E05F 15/681 160/188 |
| 2008/0156679 A1* | 7/2008 | Bonora | B65D 81/2076 206/320 |
| 2009/0016862 A1* | 1/2009 | Gould | H01L 21/67363 414/225.01 |

* cited by examiner

*Primary Examiner* — Muhammad S Islam

(57) ABSTRACT

One aspect of this disclosure provides a tote that has first and second sidewalls that define the tote's length and height and are laterally offset by the tote's width. Third and fourth substantially planar sidewalls are coupled to the first and second sidewalls to form a frame. A plurality of parallel belt guides are located within an interior space of the tote and is coupled to the frame. A belt that has at least half the tote's width is supported by the plurality of belt guides and defines at least a portion of a ceiling of the tote. The belt is movable about the interior space of the tote, such that the aperture can be positioned within the tote in one of a plurality of positions.

20 Claims, 5 Drawing Sheets

SECURE TOTE FOR ORDER FULFILLMENT AND METHOD OF OPERATION THEREOF

CROSS-REFERENCE TO RELATED APPLICATION

This application claims the benefit of U.S. Provisional Application Ser. No. 62/182,795, filed by Michael J. Doke on Jun. 22, 2015, entitled "SECURE TOTE FOR ORDER FULFILLMENT AND METHOD OF OPERATION THEREOF," commonly assigned with this application and incorporated herein by reference.

TECHNICAL FIELD

This application is directed to a secure tote for order fulfillment and a method of operating the secure tote during order fulfillment.

BACKGROUND

With the advent of internet retailers and large suppliers in general, shipment or order fulfillment has grown significantly within the last decade or so. The broad availability of internet access has allowed consumers to purchase retail items and even prescription medicines on line while sitting in the comfort of their own homes. To fulfill these order requests, retailers have developed various fulfillment systems in an attempt to keep pace with the growing number of consumer requests. Often times, these fulfillment systems include conveying an open shipment box or carrier along a conveyor system and along the way an employee will place the purchased item or items into the into the open box. Large retail fulfillment businesses, such as Amazon®, have built multi-billion dollar corporations around such fulfillment systems. Markets anticipate that the business of order fulfillment will continue to grow as more customers make more purchases of items on line.

SUMMARY

One aspect provides a tote having a length, a width and a height. In this embodiment, the tote comprises first and second sidewalls that have the tote's length and height and are laterally offset by the tote's width. Third and fourth substantially planar sidewalls are coupled to the first and second sidewalls to form a frame. The third and fourth sidewalls also have the tote's width and height. A plurality of parallel belt guides is located within an interior space of the tote and is coupled to the frame. A belt that has at least half the tote's width is supported by the plurality of the belt guides and defines at least a portion of a ceiling of the tote. The belt is movable about the interior space of the tote, such that the aperture can be positioned within the tote in one of a plurality of positions.

Another aspect of this disclosure presents a method of fulfilling an order with a tote. In this embodiment, the method comprises employing a belt drive associated with the tote to align an aperture of a belt at least partially with a ceiling of the tote wherein the belt is in a first open position. When the belt presents the first open position, an item is placed in an interior space of the tote through the aperture. The method further comprises employing the belt drive to circulate the belt from the first open position to a closed position in which the aperture is displaced from the ceiling and the belt blocks access to the interior through the ceiling.

BRIEF DESCRIPTION

Reference is now made to the following descriptions taken in conjunction with the accompanying drawings, in which.

DETAILED DESCRIPTION

Figure 1:
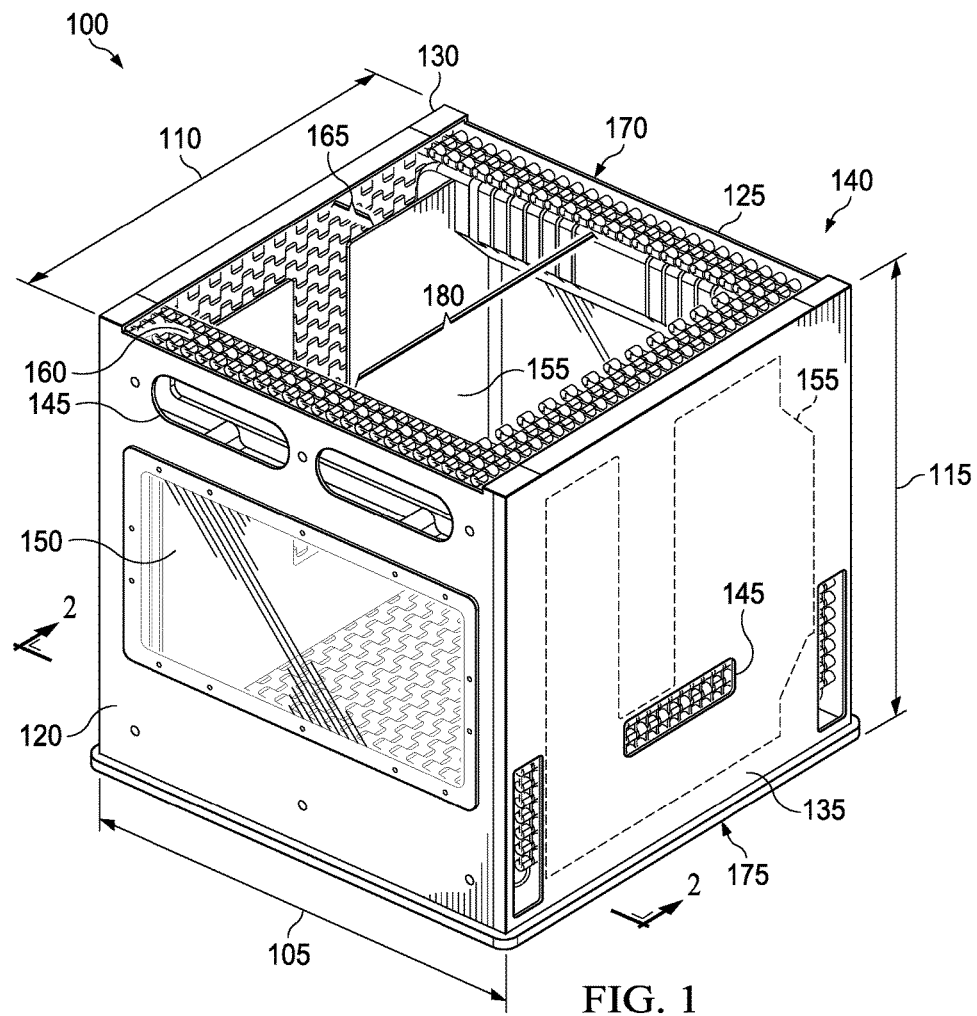
FIG. 1 illustrates a perspective view of one embodiment of the tote provided by this disclosure.

This disclosure describes various embodiments of a unique tote that a fulfillment process can use in a fulfillment system, such as a conveyor-based system. Among other things, the tote includes a belt that has an open window or aperture that is rotatable within an interior space of the tote to achieve a number of positions. The tote has opposing open ends over which the aperture may be positioned. The aperture may be moved to a receiving positioned, for example, at the top of the tote, to receive a fulfillment item, or it can be positioned in a delivery position, for example, at the bottom of the tote, to automatically release a fulfillment item. As provided herein, the tote works well in fully or highly automated (e.g., robotic systems) fulfillment systems, but is also applicable in manual systems as well, in which involve individual workers. In such systems, the tote is placed on a conveyor system that may have several different, automated fulfillment stations. While traversing the conveyor system, the tote's aperture is in a closed, secure position, that is, the aperture's position is such that the interior of the tote is not accessible because the belt forms both a closed ceiling and floor. This position prevents inadvertent insertion of incorrect fulfillment items in the tote or unauthorized removal of fulfillment items from the tote. When the tote arrives at a fulfillment station, at which the tote is to receive one or more fulfillment items, a belt drive positions the aperture in an open position, which presents an open top or ceiling, so that either a robot or individual can place predetermined fulfillment item(s) in the tote. Conversely, when it arrives at a fulfillment station where the tote is to release or deliver its contents, the belt driver positions the aperture such that an individual or robot can remove the completed fulfillment items from the tote through either the open ceiling or the open floor of the tote.

As presented herein, the embodiments of the tote provide many advantages over conventional tote systems. In such conventional systems, totes are typically open containers of some type, such as cardboard or plastic containers, that remain open while traversing the conveyor system, during which, an individual places various fulfillment items in the container. This constant open state, however, suffers from disadvantages, such as the inadvertent placement of incorrect fulfillment items in the open container or allowing the inadvertent or unauthorized removal of a fulfillment item from the container. It is not until the box arrives at its final destination that it is finally closed. This constant open and unsecure state during the fulfillment process is particularly undesirable in fulfillment systems designed to fulfill drug or medication orders.

The various embodiments of the tote provide a secure tote that prevents unintended access during the fulfillment process, which insures higher accuracy of correct fulfillment items and otherwise prevents unauthorized removal of fulfillment items from the tote during the fulfillment process.

FIG. 1 illustrates one embodiment of a tote 100, as provided herein, that a fulfillment processor may use in a fulfillment system. In this embodiment, the tote 100 has a length 105, a width 110, and a height 115. Though the illustrated embodiment is shown to be cubical, the geometric dimensions, both size and shape, may vary from one tote to another, depending on the fulfillment application.

The tote 100 has coupled first, second, third, and fourth sidewalls 120, 125, 130, 135, that form the tote's 100 frame 140 and define its length 105, width 110, and height 115. One or more of these sidewalls 120, 125, 130, 135, may be substantially planar but may include surface irregularities, such as those associated with gripping surfaces 145, such as handle grips, or bump guards (not shown) for transportation or handling purposes along a conveyor system. Additionally, the surface irregularities may arise from the presence of inspection windows 150 or a belt driver, as discussed below.

The tote 100 further comprises a plurality of parallel belt guides 155 coupled to the frame 140. In the illustrated embodiment, the belt guides 155 are panels positioned within the interior of the tote 100 and substantially parallel with the third and fourth sidewalls 130, 135, as shown. The panel 155 associated with the fourth sidewall 135 is shown in dashed lines to represent its position within the interior of the tote 100 similar or identical to that of the opposing belt guide 155. In one embodiment, the interior offset of the belt guides 155 from the third and fourth sidewalls 130, 135 form an interior perimeter belt chase 165 within the tote 100 through which a belt 160 can rotate. In one embodiment, the belt 160 is a conventional conveyor belt material, such as leather, polyethylene (PE), polypropylene (PP) and polyacetal (POM). The belt 160 may have a modular design to allow a user to tailor the dimensions, such as length and width, of the belt 160 as needed. Those in the industry that use such materials know of these modular belt systems and materials.

In another embodiment, the belt guides 155 may be a plurality of pin rods or rollers that extend across the width 110 of the tote 100 and are located at, for example, an open top/ceiling 170 and open bottom/floor 175 of the tote 100. In such embodiments, the belt 160 exteriorly wraps around and extends over the pin rods or rollers in a way to keep sufficient tension on the belt 160 such that it can rotate within the interior of the tote 100 when appropriately driven.

The belt guides 155 support the belt 160, and in one configuration the belt's 160 width is at least half the tote's width 110. In another configuration, however, the width of the belt 160 is just slightly narrower than the tote's width 110 such that the belt 160 can rotate within the interior of the tote 100. Uniquely, the belt 160 includes an aperture or window opening 180. A belt drive, as described below, moves the belt 160 to position the aperture 180 in a number of positions, depending on the tote's location in the fulfillment system. For example, as the tote 100 traverses the fulfillment system, either automatically or manually, from one station to another, the belt's 160 position is in a closed or secure configuration, such that it blocks access to the tote's 100 interior space from both the top 170 and bottom 175. This prevents the removal of fulfillment items from the tote 100 or the placement of fulfillment items into the tote 100.

However, when the tote 100 arrives at a station where it is to receive a fulfillment item, a belt drive, such as those discussed below, drives the aperture 180 to the ceiling or top 170 of the tote 100 to provide an opening to allow a fulfillment item's placement into the tote 100. In certain embodiments, the fulfillment station is equipped with sensors to detect the tote's 100 presence at the station, and a system controller instructs the fulfillment system when to place the predetermined items into the tote 100 or remove those items from the tote 100. The belt driver's programming or configuration allows it to drive the belt 160 to the closed or secure position prior to the tote's 100 delivery to the next station when the system controller instructs it to do so. Depending on the position of the aperture 180, the belt 160 defines at least a portion of a ceiling/top 170 of the tote 100 or a floor/bottom 175 of the tote 100, or alternatively, it defines an open ceiling/top or open floor/bottom. However, the aperture's position 180 is not limited to just these few examples. Further, it should be understood that the tote 100, and thus these various apertures positions, may be oriented in a horizontal direction as opposed to the illustrated vertical direction.

Figure 2:
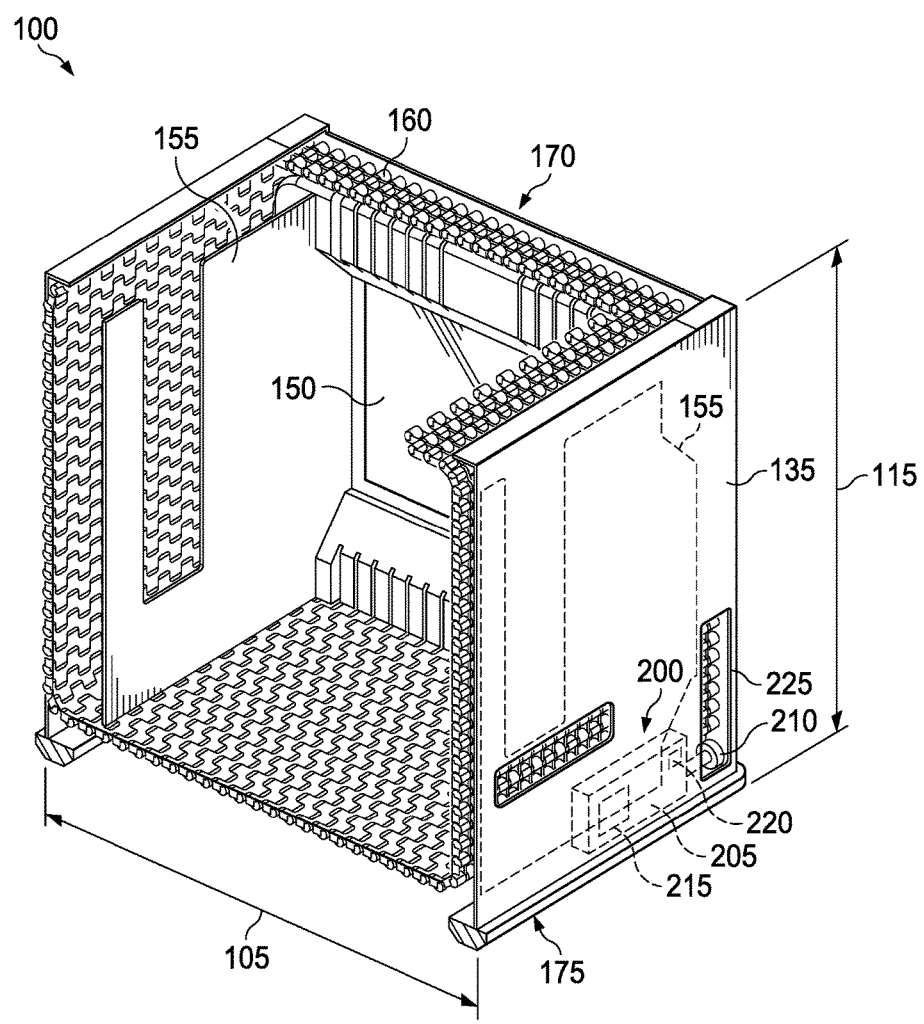
FIG. 2 illustrates a partial sectional view of the tote of FIG. 1 that further includes a belt drive.

FIG. 2 illustrates a partial sectional view of the tote 100 that further includes one embodiment of a belt drive 200. As discussed above, the belt drive 200 is selectably drivable to circulate the belt 160 about the belt guides 155 to position the aperture 180 (FIG. 1) in any number of positions with respect to the interior of the tote 100. The belt drive 200 can drive the aperture 180 at least to partially align with the tote's top/ceiling 170 or the bottom/floor 175 to allow access to an interior of the tote 100. Alternatively, the belt drive may drive the belt 160 to place the aperture 180 to prevent access to the interior of the tote 100. In such instances, the aperture 180 will not be located at either the ceiling 170 or floor 175 of the tote 100, thereby blocking access to the interior of the tote 100. As discussed above, in fulfillment systems that include a fulfillment system controller, the belt drive 200 is coupled to the system controller either wirelessly or by hard wires, whereby the system controller sends the appropriate command signals to the belt drive 200 as to the correct location of the aperture 180 within the tote 100. The system controller senses when the tote 100 arrives at a particular fulfillment station through sensors and associates that particular fulfillment station with a particular instructional command. For example, if an item is to be placed in the tote 100, the system controller provides instructions to an automated dispenser or robot to place the appropriate fulfillment item in the tote 100 and instructs the belt drive 200 to place the aperture 180 in the correct position.

On the other hand, if fulfillment is complete, the system controller provides instructions to the belt drive 200 to rotate the aperture 180 to an open position at either the ceiling 170 or floor 175, as which point the fulfillment items may be removed either manually or automatically by robot or gravity. In those instances where the aperture 180 is at the floor 175 position, the completed fulfillment items will fall through the opening and into a receiving or shipping bin or bag. If the instructions do not include dispensing or placing an item from or into the tote 100, the system controller, in some configurations, may instruct the belt drive 100 to place the aperture 180 in a closed position to prevent access to the tote's 100 interior.

It should be understood that the tote's 100 use is not limited to fulfillment systems that implement a system controller. It may also be used in more manual systems. For example, an individual may manually place the tote 100 in the appropriate fulfillment station and then press a control switch that allows the belt drive 200 to position the aperture 180 in the correct position.

In the illustrated embodiment of FIG. 2, the belt drive 200 comprises a motor 205 attached directly to the tote 100. In one configuration, a drive wheel 210 cooperatively coupled to the motor 205 contacts the belt 160. Thus, when the motor 205 rotates the wheel 210, it, in turn, rotates the belt 160 to the appropriate position. In one aspect of this embodiment, the belt drive 200 further comprises a battery 215 coupled to the motor 205 and a controller 220 configured to circulate the belt 160 to the appropriate position. In the illustrated embodiment of FIG. 2, the belt drive 200 is schematically shown and may be positioned on either the outside of the fourth sidewall 135 or within the interior of the tote 100 in the chase located between the belt guide 155 and the fourth sidewall 135. In those embodiments where the belt drive 200 is located on the outside of the tote 100, the wheel 200 contacts the belt 160 through a belt drive opening 225.

In another embodiment, the belt drive 200 is not directly attached to the tote 100 but is incorporated into the fulfillment station. In such embodiments, when the tote 100 moves into or is placed in the correct position in the fulfillment station, a drive wheel contacts the belt 160 through the belt drive opening 225, or alternatively contacts the belt 160 through the open bottom 175 of the tote 100.

The belt drive 200 may also include a locking mechanism that prevents rotation of the belt 160 to prevent access to the tote's 100 interior. In one embodiment, the locking mechanism may be pneumatically operated, electrically operated, for example by a solenoid, or mechanically operated, for example by a spring. The above embodiments are examples only, and those skilled in the art, given the teachings of this disclosure, would understand how to configure the belt drive 200 or its locking mechanisms in different ways to achieve the purposes stated herein.

Figure 3:
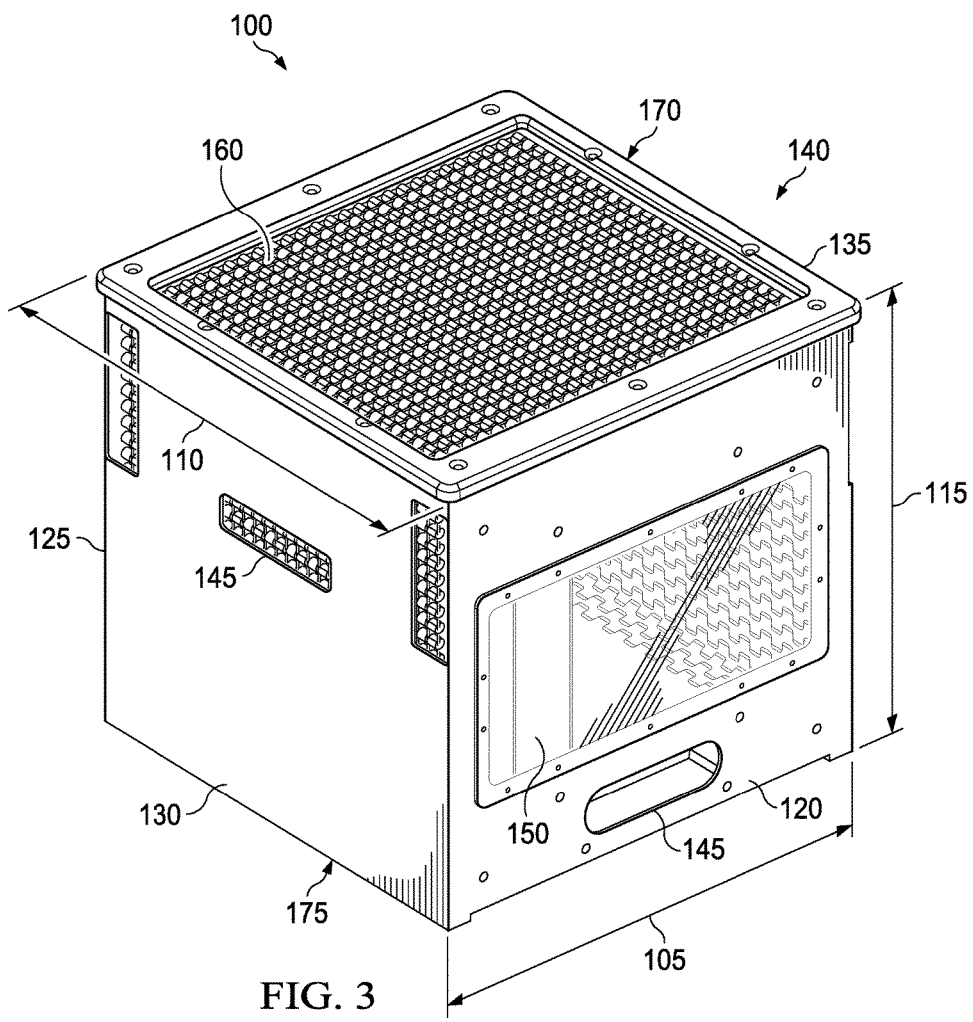
FIG. 3 illustrates a perspective view of the tote of FIG. 1 wherein the belt forms the tote's closed ceiling.

FIG. 3 illustrates the tote 100 of FIG. 1 in which the belt 160 is in a closed position with respect to the top 170 of the tote 100. In this configuration, the belt 160 closes the otherwise open top 170 of the tote 100 and forms its ceiling. FIG. 3 also shows the belt 160 in an open position with respect to the open bottom 175 of the tote 100.

Figure 4:
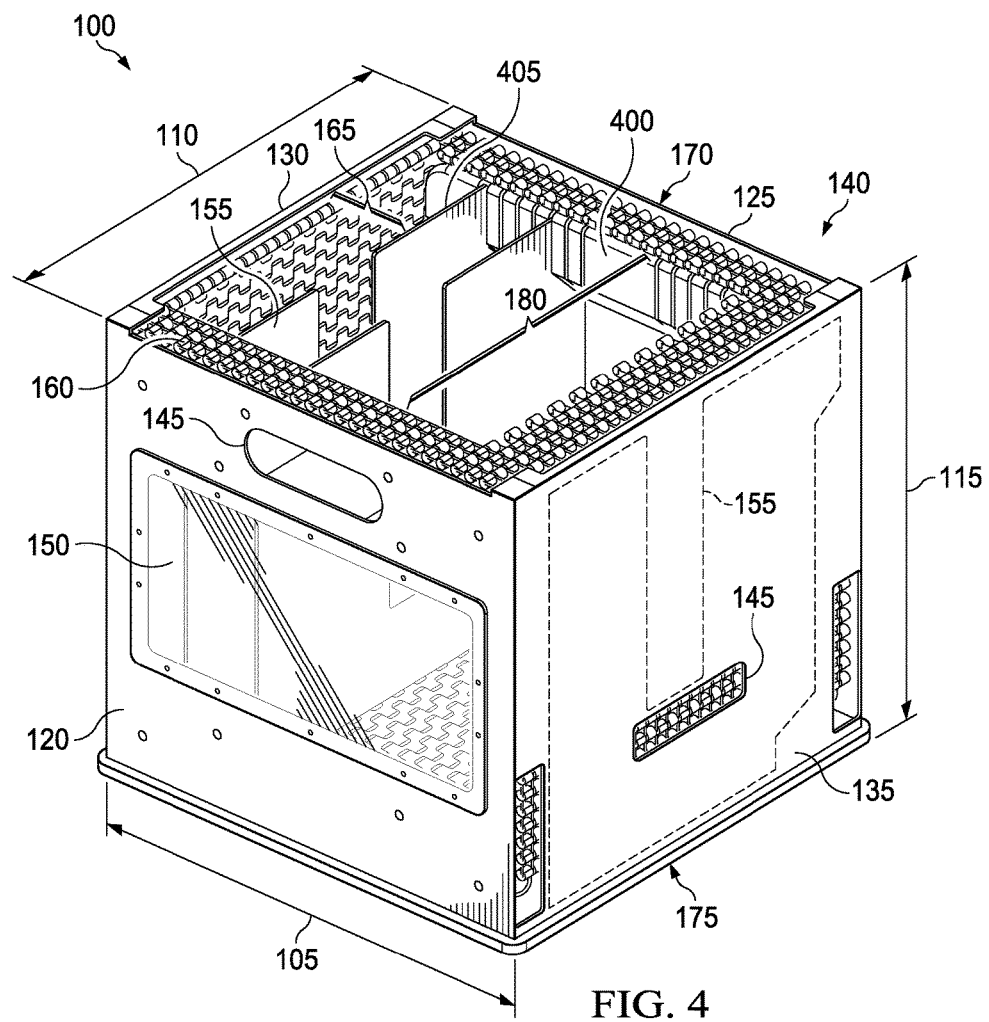
FIG. 4 illustrates a perspective view of the tote of FIG. 1 wherein the belt forms the tote's closed floor and further illustrates a compartment divider system.

FIG. 4 illustrates the tote of FIG. 1 in which the belt 160 is in an open position with respect to the open top 170 of the tote 100. FIG. 4 also shows the belt 160 in a closed position with respect to the bottom 175 of the tote 100. In this configuration, the belt 160 closes the otherwise open bottom 175 of the tote 100 and forms its floor. In addition, FIG. 4 illustrates a compartment divider structure 400 and one or more divider panels 405 positioned within the compartment divider structure 400. The compartment divider 400 has one or more slots that have a width to receive the divider panels 405 therein. This allows a user to divide the interior of the tote 100 into multiple compartments to hold different fulfillment items or change the size of those compartments to accommodate different sizes of fulfillment documentation or fulfillment items. For example, documentation can sometimes accompany the fulfillment order. This is particularly the case when the fulfillment items are prescription drugs or other medications. In such instances, when the tote 100 moves into a documentation fulfillment station, the above-discussed belt drive 200 will position the apertures 180 such that it exposes only the documentation bay of the tote 100 as defined by the divider panel 405. Once the documentation fulfillment is complete, the belt drive will move the aperture 180 to the next designated position, depending on the subsequent fulfillment action. When fulfillment is complete, an individual may observe the fulfillment items in the tote 100 through the inspection window 150. The tote 100 then proceeds to a delivery station where the belt drive 200 positions the belt's aperture to allow access or emptying of the entire tote's 100 fulfillment contents in one of the above-discussed ways.

Figure 5:
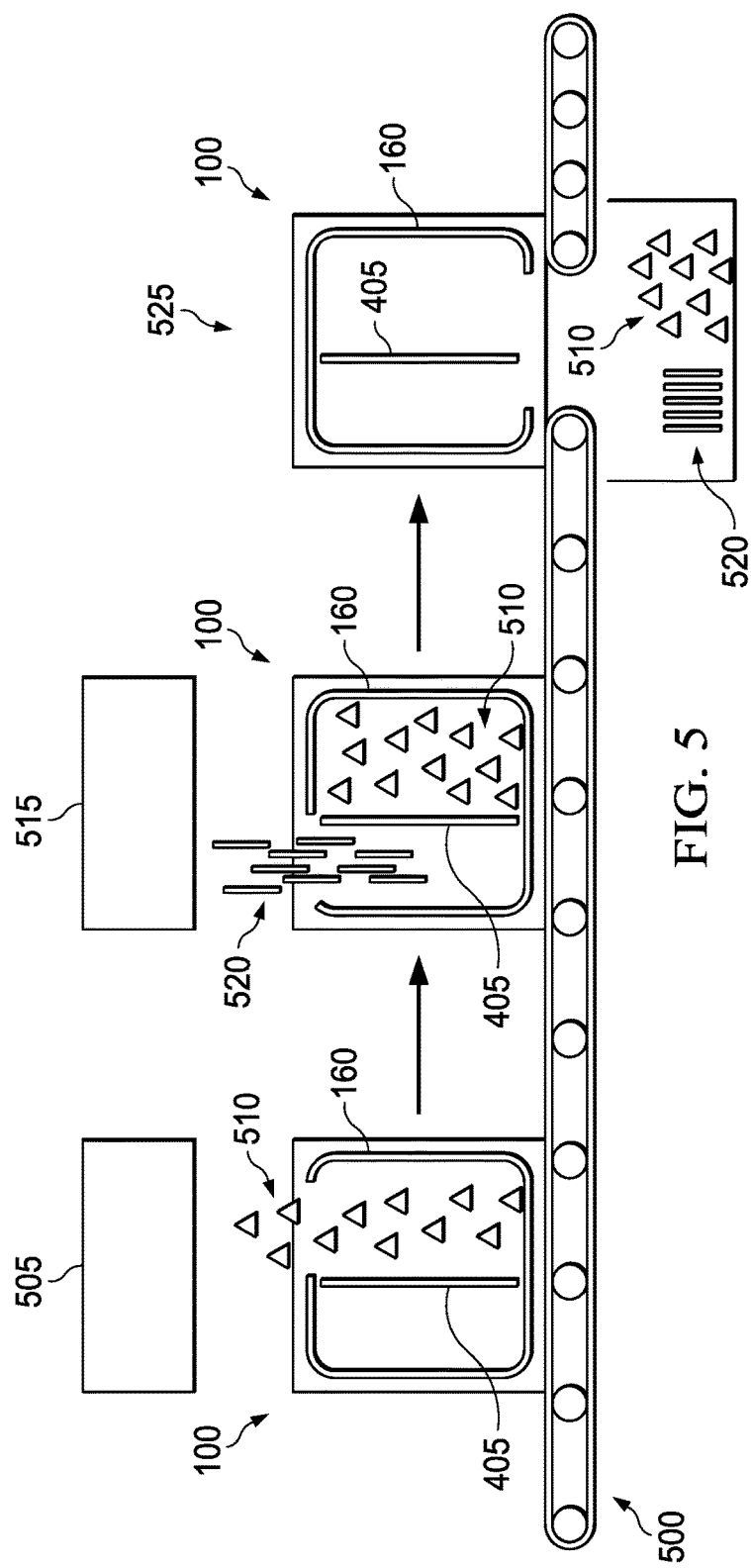
FIG. 5 illustrates a schematic view of one embodiment, by which the various fulfillment items may be dispensed into a transportation container, as provided herein.

FIG. 5 illustrates a schematic view of one embodiment, as discussed above, by which the various fulfillment items may be dispensed into a transportation container, such as a sealable bag or box. In one embodiment, the tote 100 is conveyed by a conveyer system 500 to a first fulfillment dispensing station 505. At this point, the belt 160 is positioned, as discussed above, to expose only a portion of the interior of the tote 100, which may be partitioned by the divider panel 405. The fulfillment items 510 are then either manually or automatically (e.g. robotically) placed or dispensed into the tote 100. The tote 100 is then conveyed to a next fulfillment station 515. After its arrival at station 515, the belt 160 is positioned to expose the next interior compartment of the tote 100. At station 515, fulfillment documentation 520 may be manually or automatically (e.g., robotically) placed or dispensed into the exposed compartment, as shown. This process may be repeated for more stations than those shown, depending on the number of the different types of fulfillment items that are to be placed within the tote 100.

The tote 100 is ultimately conveyed to a conventional packaging station 525 during which the tote's 100 fulfillment items 510, 520 are emptied, either manually or automatically into a shipping bag or box. The belt 160 is positioned to open the bottom of the tote 100, which allows the fulfillment items to be emptied. In the illustrated embodiment, the contents fall through the tote's 100 open end and into a shipping bag or box. The belt 160 may be positioned to successively empty each compartment, or it may be positioned to empty all of the fulfillment items concurrently. Robotics may be located at the packaging station 525 to robotically position the shipping bag or box in place and then seal them to secure the contents. For example, when a bag is used to ship the items, a robotic mechanism positions the bag in place and in some cases may cut an appropriate length of bag that will accommodate all of the fulfillment items. In those instances where the shipping bag is plastic, sealing or heating elements can be used to seal either one or both ends of the bag. In those instances where the shipping container is a box, robotic arms will fold the flaps of the box and secure them in a closed position using an adhesive tape. It should be understood that the positioning and sealing of the shipping container may also be done manually.

Thus, as seen from the foregoing, the present disclosure presents embodiments of a unique tote that can be used in a fulfillment process that increases accuracy regarding fulfillment items and secures the contents within the tote during the fulfillment process. The tote provides these advantages through the presence of the various above-described embodiments.

Those skilled in the art to which this application relates will appreciate that other and further additions, deletions, substitutions and modifications may be made to the described embodiments.

What is claimed is:

1. A tote having a length, a width and a height and comprising:

first and second sidewalls having said length and said height and laterally offset by said width;

third and fourth sidewalls having said width and said height and coupled to said first and second sidewalls to form a frame;
a plurality of parallel belt guides coupled to said frame and located within an interior space of said tote; and
a belt having an aperture and a width at least half said width, said belt supported by said plurality of belt guides and said belt defining at least a portion of a ceiling of said tote, said belt being movable about said interior space, such that said aperture is positioned within said tote in one of a plurality of positions.

2. The tote as recited in claim 1 further comprising a belt drive coupled to said belt and selectably drivable to circulate said belt about said plurality of belt guides between:
a first open position in which said aperture is at least partially aligned with said ceiling to allow access to an interior of said tote through said ceiling, and
a closed position in which said aperture is displaced from said ceiling such that said belt blocks access to said interior through said ceiling.

3. The tote as recited in claim 1 wherein said belt further defines at least a portion of a floor of said tote, said belt drive selectably drivable to circulate said belt about said plurality of belt guides between:
a second open position in which said aperture is at least partially aligned with said floor to allow access to an interior of said tote through said floor, and
said closed position in which said aperture is also displaced from said floor such that said belt blocks access to said interior through said floor.

4. The tote as recited in claim 1 wherein at least one of said first sidewall and said second sidewall includes a viewing window.

5. The tote as recited in claim 1 wherein said belt guides comprise rollers, and said belt drive is coupled to at least one of said rollers.

6. The tote as recited in claim 2 wherein said belt drive includes a drive lock selectively engageable to prevent said belt from circulating.

7. The tote as recited in claim 1 further comprising an interior wall coupled to at least one of said first and second sidewalls and dividing said interior into first and second compartments, said belt drive selectably drivable to circulate said belt about said plurality of belt guides between:
a third open position in which said aperture allows access to only said first compartment through said ceiling,
a fourth open position in which said aperture allows access to only said second compartment through said ceiling, and
said closed position in which said aperture is also displaced from said floor such that said belt blocks access to said interior through said floor.

8. The tote as recited in claim 6 wherein said first compartment is an item compartment and said second compartment is a document compartment.

9. The tote as recited in claim 2 wherein said belt drive comprises a motor.

10. The tote as recited in claim 8 wherein said belt drive further comprises a battery coupled to said motor and a controller configured to circulate said belt.

11. The tote as recited in claim 1 wherein said third and fourth sidewalls have handle apertures located therein.

12. The tote as recited in claim 2, wherein one sidewall of said first, second, third or fourth sidewalls include an aperture located on at least one side of said one sidewall that exposes said belt, such that a driving wheel is engageable against said belt to move said belt about said interior space.

13. A method of fulfilling an order with a tote, comprising:
employing a belt drive associated with said tote to align an aperture of a belt at least partially with a ceiling of said tote, said belt being in a first open position;
placing an item in an interior space of said tote through said aperture; and
further employing said belt drive to circulate said belt from said first open position to a closed position in which said aperture is displaced from said ceiling such that said belt blocks access to said interior through said ceiling.

14. The method as recited in claim 13 further comprising yet further employing said belt drive to circulate said belt from said closed position to a second open position in which said aperture is at least partially aligned with a floor of said tote, said item dropping through said floor and said aperture to exit said tote.

15. The method as recited in claim 13 further comprising inspecting said interior through a viewing window in at least one of said first sidewall and said second sidewall.

16. The method as recited in claim 13 further comprising:
disengaging a drive lock before carrying out said employing; and
releasing said drive lock to engage after carrying out said further employing.

17. The method as recited in claim 13 wherein said employing comprises employing said belt drive to align said aperture with a first compartment in said interior, said placing comprising placing said item in said first compartment through said aperture.

18. The method as recited in claim 16 wherein said first compartment is an item compartment and said tote includes a second, document compartment.

19. The method as recited in claim 13 wherein said employing and said further employing comprise activating a motor associated with said belt drive.

20. The method as recited in claim 17 wherein said employing and said further employing comprise:
deriving power from a battery coupled to said motor; and
employing a controller to circulate said belt.

* * * * *